(12) United States Patent
Knowles et al.

(10) Patent No.: US 7,911,676 B2
(45) Date of Patent: Mar. 22, 2011

(54) PHOTOCHROMIC OPTICAL ARTICLES PREPARED WITH REVERSIBLE THERMOCHROMIC MATERIALS

(75) Inventors: David B. Knowles, Apollo, PA (US); Stephen D. Straight, Austin, TX (US); Kevin J. Stewart, Murrysville, PA (US); Forrest R. Blackburn, Monroeville, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

(21) Appl. No.: 12/613,827

(22) Filed: Nov. 6, 2009

(65) Prior Publication Data
US 2010/0149620 A1 Jun. 17, 2010

Related U.S. Application Data

(60) Provisional application No. 61/122,902, filed on Dec. 16, 2008.

(51) Int. Cl.
*G02F 1/01* (2006.01)
(52) U.S. Cl. ......................................................... 359/288
(58) Field of Classification Search .................. 359/241, 359/581, 738; 549/42, 49, 59; 348/902; 351/163
See application file for complete search history.

(56) References Cited

U.S. PATENT DOCUMENTS

| | | | |
|---|---|---|---|
| 4,556,605 A | 12/1985 | Mogami et al. | |
| 4,756,973 A | 7/1988 | Sakagami et al. | |
| 4,931,220 A | 6/1990 | Haynes et al. | |
| 5,645,767 A | 7/1997 | Van Gemert | |
| 5,658,501 A | 8/1997 | Kumar et al. | |
| 6,025,026 A | 2/2000 | Smith et al. | |
| 6,060,001 A | 5/2000 | Welch et al. | |
| 6,150,430 A | 11/2000 | Walters et al. | |
| 6,153,126 A | 11/2000 | Kumar | |
| 6,187,444 B1 | 2/2001 | Bowles, III et al. | |
| 6,268,055 B1 | 7/2001 | Walters et al. | |
| 6,296,785 B1 | 10/2001 | Nelson et al. | |
| 6,348,604 B1 | 2/2002 | Nelson et al. | |
| 6,353,102 B1 | 3/2002 | Kumar | |
| 6,432,544 B1 | 8/2002 | Stewart et al. | |
| 6,436,525 B1 | 8/2002 | Welch et al. | |
| 6,506,488 B1 | 1/2003 | Stewart et al. | |
| 6,531,076 B2 | 3/2003 | Crano et al. | |
| 6,602,603 B2 | 8/2003 | Welch et al. | |
| 7,320,826 B2 * | 1/2008 | Kumar et al. | 428/411.1 |
| 7,432,027 B2 * | 10/2008 | Chopra et al. | 430/19 |
| 2005/0254003 A1 | 11/2005 | Jani et al. | |
| 2007/0259598 A1 | 11/2007 | Ribi | |
| 2009/0283728 A1 * | 11/2009 | Byker et al. | 252/586 |
| 2009/0302284 A1 * | 12/2009 | Fischer et al. | 252/602 |

FOREIGN PATENT DOCUMENTS
WO WO 01/02449 A2 1/2001

OTHER PUBLICATIONS

*Techniques in Chemistry*, vol. III, "Photochromism", Chapter 3, Glenn H. Brown, Editor, John Wiley and Sons, Inc., New York, 1971.
A. Koll, "Specific Features of Intramolecular Proton Transfer Reaction in Schiff Bases", International Journal of Molecular Sciences, vol. 4, 2003, pp. 434-444, XP-002572993.

* cited by examiner

*Primary Examiner* — Ricky L Mack
*Assistant Examiner* — Tuyen Q Tra
(74) *Attorney, Agent, or Firm* — Deborah M. Altman; Frank P. Mallak

(57) ABSTRACT

Provided is a photochromic optical article including: (a) an optical substrate; (b) a thermally reversible photochromic material; and (c) reversible thermochromic material capable of at least partially filtering UV/visible light at or below room temperature and becoming less capable of filtering UV/visible light at temperatures greater than room temperature.

16 Claims, No Drawings

PHOTOCHROMIC OPTICAL ARTICLES PREPARED WITH REVERSIBLE THERMOCHROMIC MATERIALS

CROSS-REFERENCE TO RELATED APPLICATIONS

This application claims the benefit of priority from U.S. Provisional Application No. 61/122,902 filed Dec. 16, 2008, which is incorporated by reference herein in its entirety.

FIELD OF USE

The present invention relates to photochromic optical articles prepared with reversible thermochromic materials capable of filtering ultraviolet and visible light ("UV-Vis") at or below room temperature and becoming less capable of filtering UV/Vis light at temperatures greater than room temperature.

BACKGROUND OF THE INVENTION

Photochromism is a property of certain classes of molecules in which visible or ultraviolet light leads to the reversible isomerization of the molecule to another form having a different UV-visible absorption spectrum. Compounds of this type have found widespread use in sunlight-responsive optical articles, such as ophthalmic lenses, goggles, face shields, windows, aircraft transparencies, and display screens. Photochromic molecules can be loosely divided into two types: those that return to their initial state at a rate dependent on the ambient temperature ("thermally reversible" photochromic materials), and those which are thermally stable, requiring light absorption of a different wavelength to return to their initial state.

It is apparent that for the type of photochromic molecules that thermally return to their initial state, the equilibrium between isomeric forms is a function of both light intensity incident and the temperature of the matrix in which they are contained. This is the case for photochromic molecules typically incorporated into optical articles such as those previously mentioned. That is, for such thermally reversible photochromic molecules, their degree of activation (degree of coloring) displays a temperature dependent response. For reasons both cosmetic and practical it is desirable to mitigate this temperature dependence to some extent.

SUMMARY OF THE INVENTION

The present invention is directed to a photochromic optical article comprising: (a) an optical substrate; (b) a thermally reversible photochromic material; and (c) a reversible thermochromic material capable of at least partially filtering UV/visible light at or below room temperature and becoming less capable of filtering UV/visible light at temperatures greater than room temperature.

DETAILED DESCRIPTION OF THE INVENTION

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited numerical ranges. Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The various embodiments and examples of the present invention as presented herein are each understood to be non-limiting with respect to the scope of the invention.

As used in the following description and claims, the following terms have the indicated meanings:

The terms "on", "appended to", "affixed to", "bonded to", "adhered to", or terms of like import means that the designated item, e.g., a material, a coating, film or layer, is either directly connected to (superimposed on) the object surface, or indirectly connected to the object surface, e.g., through one or more other coatings, films or layers (superposed on).

The term "ophthalmic" refers to elements and devices that are associated with the eye and vision, such as but not limited to, lenses for eyewear, e.g., corrective and non-corrective lenses, and magnifying lenses.

The term "optical quality", as used for example in connection with polymeric materials, e.g., a "resin of optical quality" or "organic polymeric material of optical quality" means that the indicated material, e.g., a polymeric material, resin, or resin composition, is or forms a substrate, layer, film or coating that can be used as an optical article, such as an ophthalmic lens, or in combination with an optical article.

The term "rigid", as used for example in connection with an optical substrate, means that the specified item is self-supporting.

The term "light influencing function", "light influencing property" or terms of like import means that the indicated material, e.g., coating, film, substrate, etc., is capable of modifying by absorption (or filtering) of incident light radiation, e.g., visible, ultraviolet (UV) and/or infrared (IR) radiation that impinges on the material. In alternate embodiments, the light influencing function can be light polarization, e.g., by means of a polarizer and/or dichroic dye; a change in light absorption properties, e.g., by use of a chromophore that changes color upon exposure to actinic radiation, such as a photochromic material; transmission of only a portion of the incident light radiation, e.g., by use of a fixed tint such as a conventional dye; or by a combination of one or more of such light influencing functions.

The term "adapted to possess at least one light influencing property", as used for example in connection with a rigid optical substrate, means that the specified item is capable of having the light influencing property incorporated into or appended to it. For example, a plastic matrix that is adapted to possess a light influencing property means that the plastic matrix has sufficient internal free volume to accommodate internally a photochromic dye or tint. The surface of such a plastic matrix may alternatively be capable of having a photochromic or tinted layer, film or coating appended to it, and/or is capable of having a polarizing film appended to it.

The term "optical substrate" means that the specified substrate exhibits a light transmission value (transmits incident light) of at least 4 percent and exhibits a haze value of less than 1 percent, e.g., less than 0.5 percent, when measured at 550 nanometers by, for example, a Haze Gard Plus Instrument. Optical substrates include, but are not limited to, optical articles such as lenses, optical layers, e.g., optical resin layers, optical films and optical coatings, and optical substrates having a light influencing property.

The term "transparent", as used for example in connection with a substrate, film, material and/or coating, means that the indicated substrate, coating, film and/or material has the property of transmitting light without appreciable scattering so that objects lying beyond are entirely visible.

The phrase "an at least partial film" or an 'at least partial coating" means an amount of film covering at least a portion, up to the complete surface of the substrate. As used herein, a "film" may be formed by a sheeting type of material or a coating type of material. For example, a film may be an at least partially cured polymeric sheet or an at least partially cured polymeric coating of the material indicated.

The term "photochromic" means having an absorption spectrum for at least visible radiation that varies in response to at least actinic radiation. As used herein, the term "photochromic material" means any substance that displays photochromic properties, i.e. adapted to have an absorption spectrum for at least visible radiation that varies in response to at least actinic radiation. Also, as used herein, the term "actinic radiation" refers to electromagnetic radiation that is capable of causing a photochromic material to transform from one form or state to another.

As previously mentioned, the present invention is directed to a photochromic optical article comprised of (a) an optical substrate; (b) a thermally reversible photochormic material; and (c) a reversible thermochromic material capable of at least partially filtering UV/visible light at or below room temperature and becoming less capable of filtering UV/visible light at temperatures greater than room temperature. By the term "filtering UV/visible light" is meant herein that the thermochromic material can block entirely or attenuate (i.e., reduce the amount of) transmittance of UV/visible light.

In the case of the photochromic molecules incorporated into optical articles as mentioned above, it is the intensity of UV-light that pushes the equilibrium between isomers towards the visible absorbing forms (i.e., the colored state). Thus, the present invention provides an optical article which comprises one or more reversible thermochromic materials capable of at least partially filtering UV/visible light at or below room temperature that are "complementary" to the temperature dependence of the thermally reversible photochromic material. That is, a reversible thermochromic material that transmits more light at warm temperatures would allow more light to activate the photochromic molecules and, thus, would decrease the effect of temperature on the overall equilibrium between isomers. Likewise, a reversible thermochromic material that blocks (i.e., filters) more UV/Vis light at low temperatures would allow less light to activate the photochromic molecules and, thus, would decrease the effect of temperature on the equilibrium between isomers. By screening out (i.e., "filtering") the UV/Vis light at low temperatures and allowing increased transmittance at high temperatures, these reversible thermochromic materials provide a photochromic optical article which more uniformly activates (i.e., colors or darkens) across a wide range of temperatures.

For purposes of the present invention, the reversible thermochromic material (c) is capable of filtering UV/Vis light in the range of less than 450 nanometers, such as 300 to 450 nanometers, or from 310 to 430 nanometers, or from 330 to 410 nanometers. Further the reversible thermochromic material (c) is capable of filtering UV/Vis light at a temperature at or below room temperature, for example, at or below 25° C. (+/−3° C.), such as a temperature at or below 0° C., or at or below −10° C. Also the reversible thermochromic material (c) is capable of filtering UV/Vis light at a temperature greater than −100° C., such as greater than −50° C., or greater than −30° C. The reversible material (c) is capable of filtering UV/Vis light at a temperature ranging between any of the aforementioned temperatures, inclusive of those recited.

As previously mentioned, the reversible thermochromic material (c) also is less capable of filtering UV/Vis light at temperatures greater than room temperature (i.e., at temperatures greater than about 25° C. (+/−3° C.). It should be noted that the term "less capable of filtering UV/Vis light at temperatures greater than room temperature" does not necessarily exclude absorbance of some UV/Vis light at temperatures greater than room temperature.

In an alternate embodiment of the present invention, the reversible thermochromic material (c) can be capable of filtering UV/Vis light at temperatures greater than room temperature. For some applications, it may be desirable to filter UV/Vis light at temperatures, for example, greater than 30° C., or greater than 50° C., or greater than 70° C. In the optical article of the present invention, the photochromic material can be incorporated into the matrix from which the optical article is prepared, and/or the photochromic material can be appended to the surface of the optical substrate. Incorporating the photochromic material into the optical article matrix can be accomplished, for example, by admixing one or more photochromic materials with the polymeric components from which the optical article matrix is prepared prior to casting or otherwise forming the article. The photochromic material may or may not be reactive with the polymers used to form the matrix. Appending the photochromic material to the optical article can be accomplished through any of a variety of means including, for example, the imbibition of a photochromic material into the substrate surface or by way of application of a photochromic coating composition over the optical substrate surface to form an at least partial photochromic coating on the optical substrate. As used herein the term "imbibition" includes permeation of the photochromic material alone into the optical substrate material, solvent assisted transfer of the photochromic material into a porous polymeric optical substrate material, vapor phase transfer, and other such transfer methods. One or more of the reversible thermochromic materials (c), capable of at least partially filtering UV/Vis light at or below room temperature and becoming less capable of filtering UV/Vis light at temperatures greater than room temperature can be incorporated into the photochromic optical article as an at least partial coated layer over and appended to the photochromic material; and/or one or more of the temperature-dependent UV absorbers of the present invention can be included as a component of the photochromic material itself.

The reversible thermochromic materials (c), capable of at least partially filtering UV/visible light at or below room temperature and becoming less capable of filtering UV/visible light at temperatures greater than room temperature can comprise either small molecules and/or polymers which are dissolved in a host material (that is, a solvent or a resinous binder system) and applied as an at least partial coating over the thermally reversible photochromic material which had been previously applied to the optical substrate; or the reversible thermochromic materials (c), can be applied "neat" (i.e., without a host material) directly to the photochromic material, for example, as an at least partial film or coating over and appended to the photochromic material.

In one embodiment reversible thermochromic materials (c) capable of at least partially filtering UV/visible light at or below room temperature and becoming less absorbing at temperature greater than room temperature comprise tautomers and/or thermochromic polymers which undergo conformational induced chromism in response to temperature (such as a helical polymer).

Tautomers are molecules which exist in two different isomer forms that are inter-convertible through rearrangement of the connectivity of their atoms. This rearrangement frequently includes the movement of a proton from one heteroatom to another or the opening of a ring structure containing heteroatoms to form a chain structure. A number of other tautomeric interconversions can also occur. The equilibrium between the tautomeric forms of a molecule can vary with temperature as well as solvent or matrix polarity.

Non-limiting examples of suitable tautomers for use as the reversible thermochromic material (c) in the optical article of the present invention can include Schiff bases and Mannich bases.

Suitable Schiff bases can include those having the following structural formula I-A:

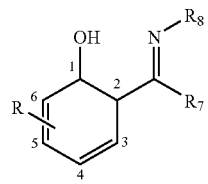

I-A wherein R is hydrogen, hydroxyl, halogen, $C_1$-$C_{12}$ alkoxy, $C_1$-$C_{12}$ alkyl, amides, amines, esters, nitro, $C_1$-$C_6$ imino($C_1$-$C_6$)alkyl, benzylimino($C_1$-$C_6$)alkyl, aryl and substituted aryl wherein the substitutents are chosen from hydrogen, hydroxyl, halogen, $C_1$-$C_{12}$ alkoxy, $C_1$-$C_{12}$ alkyl, amides, amines, esters, nitro, $C_1$-$C_6$ imino($C_1$-$C_6$)alkyl, benzylimino ($C_1$-$C_6$)alkyl, and aryl or two adjacent R goups, e.g. at the 5- and 6-positions, come together to form a 5 or 6 membered cyclic or heterocyclic ring; $R_7$ is a $C_1$-$C_{12}$ alkyl, aryl or substituted aryl defined above; and $R_8$ is a $C_1$-$C_{12}$ alkyl, a benzyl group, or a substituted benzyl group, having the same substituents as the aryl group described above.

Generally, such Schiff bases can be prepared as shown below by refluxing, for example, an aromatic ketone or aldehyde such as one represented by Compound A, with a nucleophile such as the aliphatic amine represented as Compound B, in an alcohol solution (e.g., an ethanol solution). More specifically Compound A can be an acetophenone bearing a hydroxy group in the ortho position and Compound B can be an aliphatic amine or a benzylic amine, including those with both substituted and unsubstituted aromatic rings. The temperature-dependent UV absorber thus obtained typically crystallizes out of solution upon cooling and can be collected by filtration. Very infrequently, the UV absorber is in the form of an oil which then can be isolated via separation techniques.

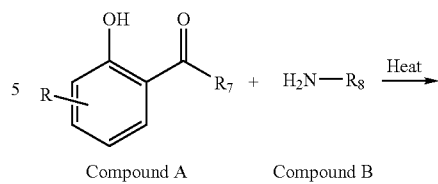

Compound A          Compound B

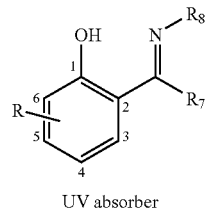

UV absorber

Suitable Schiff bases can include, for example, the following materials:

| | |
|---|---|
| See Example 1 below for preparation. | 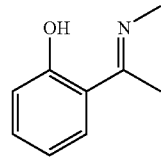 |
| See Example 2 below for preparation. | 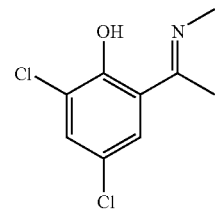 |
| See Example 3 below for preparation. | 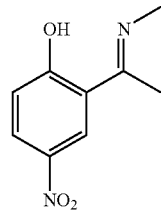 |
| See Example 4 below for preparation. | 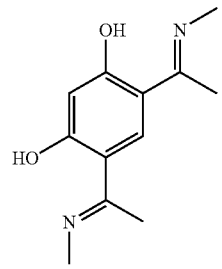 |
| See Example 5 below for preparation. | 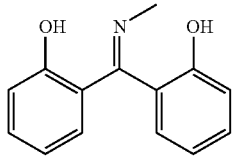 |

| | | | |
|---|---|---|---|
| See Example 6 below for preparation. | 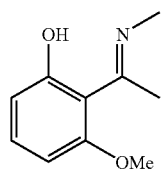 | See Example 13 below for preparation. | 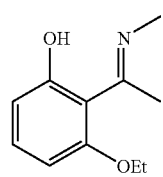 |
| See Example 7 below for preparation. | 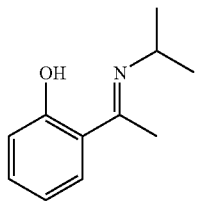 | See Example 14 below for preparation. | 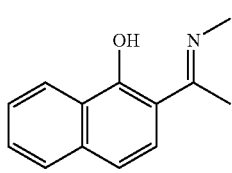 |
| See Example 8 below for preparation. | 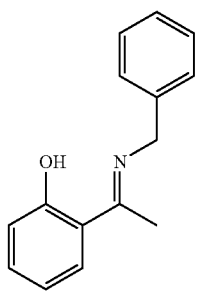 | See Example 15 below for preparation. | 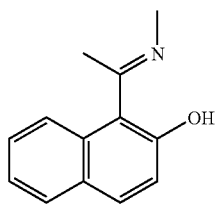 |
| See Example 9 below for preparation. | 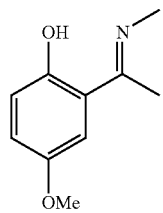 | See Example 16 below for preparation. | 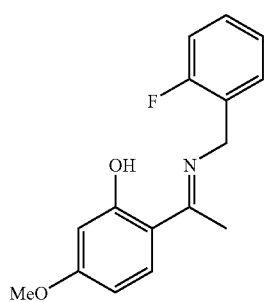 |
| See Example 10 below for preparation. | 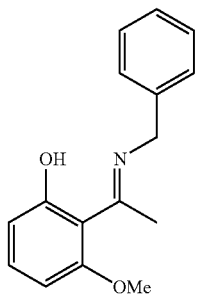 | See Example 17 below for preparation. | 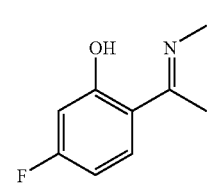 |
| See Example 11 below for preparation. | 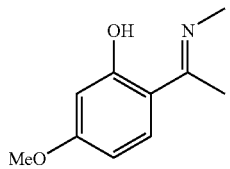 | See Example 18 below for preparation. | 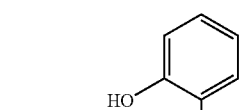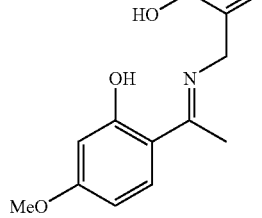 |
| See Example 12 below for preparation. | 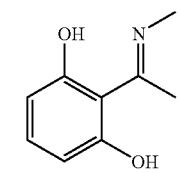 | See Example 19 below for preparation. | 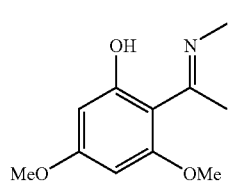 |

See Example 20 below for preparation.

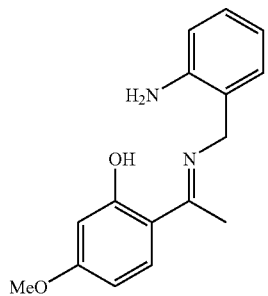

Suitable Mannich bases can include materials such as those derived from the end-product of the Mannich Reaction involving an amino alkylation with an acidic proton next to an aldehyde or ketone resulting in a beta-amino-carbonyl or Mannich Base.

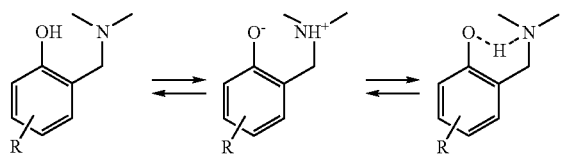

Mannich bases, involve an intramolecular equilibrium between proton-donor (OH) and a proton-acceptor (N) hydrogen-bonded species as shown above. As the temperature is lowered the equilibrium is shifted to the more protonated form and a change in the absorbance spectrum can be observed. When an increase in the absorption occurs the amount of UV light that passes through the article is attenuated. Conversely, when the temperature is raised a decrease in the absorption spectrum is observed allowing additional light to pass through the article.

The Mannich base derivatives listed hereinafter can be formed by the following general procedure using, for example 2,4-dihydroxybenzophenone, as the starting material. The 2,4-Dihydroxybenzophenone is introduced into a reaction flask equipped with an addition funnel, heating mantle, magnetic stirrer, dean stark trap and nitrogen inlet/bubbler. Toluene and/or toluene/ethanol is added and the solution is stirred under nitrogen. The solubility of 2,4-dihydroxybenzophenone is greater in toluene/ethanol mixtures at room temperature. An equimolar amount of amine then is added. An equimolar amount of formalin (37% aqueous formaldehyde solution) is added dropwise to the mixture which warms during the addition. Once the addition is complete, the mixture is refluxed and water is removed via a Dean Stark trap. Reaction mixture is checked periodically for remaining reactant benzophenone by TLC. Once little or no 2,4-dihydroxybenzophenone is observed to be present by TLC, the reaction mixture is cooled. The solvent is removed and the crude product is recrystallized. If the recrystallization cannot be accomplished, a sample of the crude product can be columned. The mobile phase used in the chromatography is dependent upon the basicity of the amine employed. Typically, chromatography is conducted using silica gel as stationary phase and either ethyl acetate/ethanol or chloroform/ethanol mobile phases to elute the Mannich base products.

| Mannich base structure | Compound Name |
|---|---|
| | (3-piperidinylmethyl)-2,4-dihydroxybenzophenone |
| | (3-morpholinylmethyl)-2,4-dihydroxybenzophenone |
| | (3-pyrrolidinylmethyl)-2,4-dihydroxybenzophenone |
| | (3-benzylmethylaminomethyl)-2,4-dihydroxybenzophenone |
| | (3,5-dipiperidinylmethyl)-2,4-dihydroxbenzophenone |
| | (3-(bis-(2-hydroxyethyl)aminomethyl)-2,4-dihydroxybenzophenone |
| | Methyl-3-(pyrrolidinylmethyl)-4-hydroxy cinnamate |

| Mannich base structure | Compound Name |
|---|---|
| 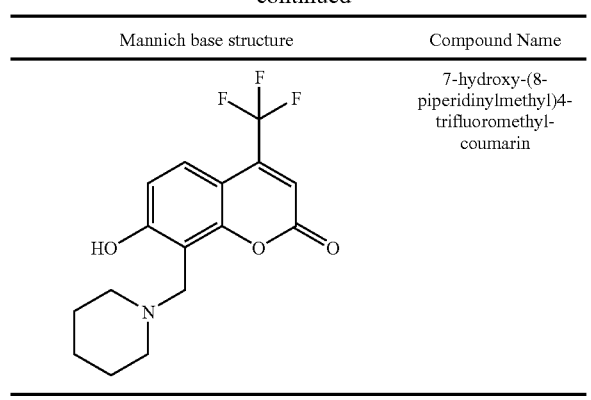 | 7-hydroxy-(8-piperidinylmethyl)4-trifluoromethyl-coumarin |

As previously mentioned, the reversible thermochromic materials (c) capable of at least partially filtering UV/visible light at or below room temperature and becoming less absorbing at temperature greater than room temperature also can comprise thermochromic polymers which undergo conformational induced chromism in response to temperature (such as a helical polymer).

Such materials can undergo conformational induced chromism, i.e., a reversible change, in the UV-visible absorption spectrum with a change in temperature. Although no definite mechanism has yet been established it is believed that such thermochromic polymers undergo a reversible "transition" between a coplanar (highly conjugated) form and a nonplanar (less conjugated) form. There are many types of examples known in the literature such as polythiophenes, polysilanes, poly(propargyl amides) and polydiacetylenes.

Non-limiting examples of suitable polymers which under conformation induced chromism include those having the structure below where R' can be an $C_1$-$C_{12}$ alkyl, a perfluoro ($C_1$-$C_{12}$) alkyl, $C_1$-$C_{12}$ alkoxy, a trityl group, an $C_1$-$C_{12}$ ether, a $C_1$-$C_{12}$ cyclic ether, a $C_1$-$C_{12}$ cyclic lactone, an $C_1$-$C_{12}$ alkyl chain substituted with from 1 to 4 phenyl rings, a benzyl group, a substituted benzyl group, wherein the benzyl substitutents are chosen from hydrogen, hydroxyl, halogen, $C_1$-$C_{12}$ alkoxy, $C_1$-$C_{12}$ alkyl, amides, amines, esters, nitro, $C_1$-$C_6$ imino($C_1$-$C_6$)alkyl, benzylimino($C_1$-$C_6$)alkyl, and aryl; and copolymers thereof can be prepared by polymerization of the corresponding propargylamide monomer. This monomer is produced by reaction of an acid chloride or acid anhydride bearing the R' group with a nucleophile, typically propargylamine. The polymer is prepared by polymerization of a monomer with bicyclo(2.2.1)hepta-2,5-diene-rhodium$^{(I)}$ tetraphenylborate catalyst.

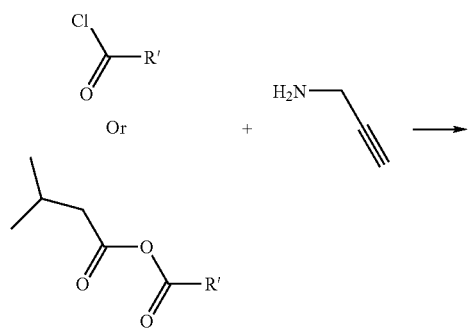

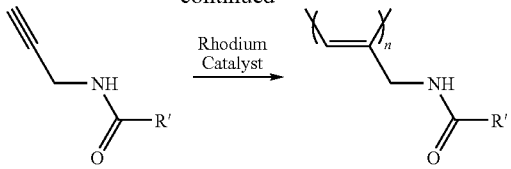

Specific polymers which undergo conformation induced chromism in response to temperature can include, for example, the following materials:

| | |
|---|---|
| See Example 28 below for preparation. | 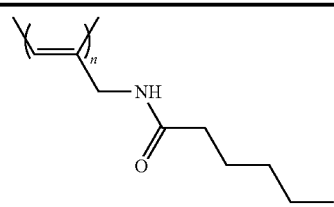 |
| See Example 29 below for preparation. | 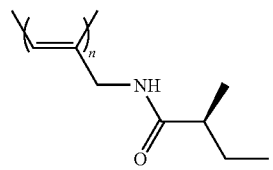 |

Substrates

Substrates suitable for use in the preparation of the photochromic optical articles of the present invention as the optical substrate (a) can include any of the plastic optical substrates known in the art and can include nonplastic substrates such as glass. Suitable examples of plastic optical substrates, can include polyol(allyl carbonate) monomers, e.g., allyl diglycol carbonates such as diethylene glycol bis(allyl carbonate), which monomer is sold under the trademark CR®-39 by PPG Industries, Inc; polyurea-polyurethane (polyurea urethane) polymers, which are prepared, for example, by the reaction of an isocyanate-functional polyurethane prepolymer and a diamine curing agent, a composition for one such polymer being sold under the trademark TRIVEX® by PPG Industries, Inc; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly (ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co-and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, e.g., to form interpenetrating network products.

Further, the substrates may have a protective coating, such as, but not limited to, an abrasion-resistant coating, such as a "hard coat," on their exterior surfaces. For example, commercially available thermoplastic polycarbonate ophthalmic lens substrates are often sold with an abrasion-resistant coating already applied to its exterior surfaces because these surfaces tend to be readily scratched, abraded or scuffed. An example of such a lens substrate is the GENTEXT™ polycarbonate lens (available from Gentex Optics). Therefore, as used herein the term "substrate" includes a substrate having a protective coating, such as but not limited to an abrasion-resistant coating, on its surface(s).

Still further, the substrates can be transparent or possess a light influencing property. Suitable optical substrates can be untinted, tinted, linearly polarizing, circularly polarizing, elliptically polarizing, photochromic, or tinted-photochromic substrates. As used herein with reference to substrates the term "untinted" means substrates that are essentially free of coloring agent additions (such as, but not limited to, conventional dyes) and have an absorption spectrum for visible radiation that does not vary significantly in response to actinic radiation. Further, with reference to substrates the term "tinted" means substrates that have a coloring agent addition (such as, but not limited to, conventional dyes) and an absorption spectrum for visible radiation that does not vary significantly in response to actinic radiation.

As used herein the term "linearly polarizing" with reference to substrates refers to substrates that are adapted to linearly polarize radiation. As used herein the term "circularly polarizing" with reference to substrates refers to substrates that are adapted to circularly polarize radiation. As used herein the term "elliptically polarizing" with reference to substrates refers to substrates that are adapted to elliptically polarize radiation.

Photochromic Materials

Photochromic materials which are suitable for use in the photochromic optical article of the present invention as the thermally reversible photochromic material (b) can include pyrans, fulgides and oxazines. Specific examples of suitable thermally reversible photochromic materials can include, but are not limited to, the following classes of materials: chromenes, e.g., naphthopyrans, benzopyrans, indenonaphthopyrans and phenanthropyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline)naphthoxazines, spiro(indoline)pyridobenzoxazines, spiro(benzindoline)pyridobenzoxazines, spiro(benzindoline)naphthoxazines and spiro(indoline)benzoxazines; fulgides, fulgimides and mixtures of such photochromic compounds. Such photochromic compounds are described in U.S. Pat. Nos. 4,931,220 at column 8, line 52 to column 22, line 40; 5,645,767 at column 1, line 10 to column 12, line 57; 5,658,501 at column 1, line 64 to column 13, line 17; 6,153,126 at column 2, line 18 to column 8, line 60; 6,296,785 at column 2, line 47 to column 31, line 5; 6,348,604 at column 3, line 26 to column 17, line 15; and 6,353,102 at column 1, line 62 to column 11, line 64. Spiro(indoline)pyrans are also described in the text, *Techniques in Chemistry*, Volume III, "Photochromism", Chapter 3, Glenn H. Brown, Editor, John Wiley and Sons, Inc., New York, 1971. Likewise, the photochromic optical article of the present invention also can comprise photochromic-dichroic dyes. Mixtures of any of the foregoing can be employed. Other conventional colorant dyes and/or conventional dischroic dyes as are known in the art may be used in conjunction with the aforementioned photochromic materials as well.

The photochromic materials used in the optical articles of the present invention can be appended to the optical substrate by imbibition as discussed above. Alternatively, the photochromic materials can be applied to the optical substrate as a coating composition to form an at least partial photochromic coating on the surface of the optical substrate. Non-limiting examples of conventional photochromic coatings include coatings comprising any of the conventional photochromic compounds that are discussed in detail above. For example, although not limiting herein, the photochromic coatings can be photochromic polyurethane coatings, such as those described in U.S. Pat. No. 6,187,444; photochromic aminoplast resin coatings, such as those described in U.S. Pat. Nos. 4,756,973, 6,432,544 and 6,506,488; photochromic polysilane coatings, such as those described in U.S. Pat. No. 4,556,605; photochromic poly(meth)acrylate coatings, such as those described in U.S. Pat. Nos. 6,602,603, 6,150,430 and 6,025,026, and WIPO Publication WO 01/02449; polyanhydride photochromic coatings, such as those described in U.S. Pat. No. 6,436,525; photochromic polyacrylamide coatings such as those described in U.S. Pat. No. 6,060,001; photochromic epoxy resin coatings, such as those described in U.S. Pat. Nos. 4,756,973 and 6,268,055; and photochromic poly(urea-urethane) coatings, such as those described in U.S. Pat. No. 6,531,076. The specifications of the aforementioned U.S. Patents and international publications are hereby specifically incorporated by reference herein.

Miscellaneous Coatings

It should be mentioned, that a transitional coating can be applied to the optical substrate, for example, prior to application of the photochromic material. As used herein the term "transitional coating" means a coating that aids in creating a gradient in properties between two coatings. For example, although not limiting herein, a transitional coating can aid in creating a gradient in hardness between a relatively hard coating (such as the previously mentioned protective hard coating which can be applied directly to the optical substrate surface) and a relatively soft coating (such as a photochromic coating); or between a relatively softer photochromic coating and a subsequently applied abrasion-resistant coating. Non-limiting examples of transitional coatings can include radiation-cured acrylate-based thin films.

One or more protective coatings can be applied over the photochromic material (for example, in the case where the temperature dependent UV absorber of the present invention has been included as a component in the photochromic material), or over the temperature dependent UV absorber which has been applied to the photochromic material. Non-limiting examples of protective coatings can include abrasion-resistant coatings comprising organo silanes, abrasion-resistant coatings comprising radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. For example, the protective coating can comprise a first coating of a radiation-cured acrylate-based thin film and a second coating comprising an organo-silane. Non-limiting examples of commercial protective coatings products include SILVUE® 124 and HI-GARD® coatings, available from SDC Coatings, Inc. and PPG Industries, Inc., respectively.

The present invention is more particularly described in the following examples that are intended as illustration only, since numerous modifications and variations therein will be apparent to those skilled in the art.

EXAMPLES

In Part A, the preparation of the Schiff bases of Examples 1-20 was described. In Part B, the changes in optical density of Examples 1-20 in solution was reported. In Part C, the preparation of the polymer films of Examples 21-27 was described. In Part D, the measurement of the changes in optical density of the polymer films was reported. In Part E, the preparation of the thermochromic polymers of Examples 28 and 29 was described. In Part F, the measurement of the changes in optical density of the thermochromic polymers was described. In Part G, the preparation and testing of an assembly of the polymer of Example 28 in solution in front of a photochromic coated chip was described.

Part A—Preparation of Schiff Bases

Example 1

2-Hydroxyacetophenone (0.88 mL, 7.4 mmol), was dissolved in 10 mL of ethanol in a small round bottom flask. Methylamine (4 mL, 8.1 mmol), as a 2M solution in tetrahydrofuran (THF), was added and the resulting reaction mixture was heated to reflux under nitrogen. The reaction mixture became yellow in color. After 30 minutes the reaction mixture was cooled to room temperature and the solvent removed to yield a yellow crystalline solid. The yellow solid was dissolved in 15 mL of toluene and then the toluene was evaporated to yield a yellow crystalline product (890 mg, 5.89 mmol). NMR analysis showed the product to have a structure consistent with the following name: (E)-2-(1-(methylimino)ethyl)phenol.

Example 2

3,5-Dichloro-2-hydroxyacetophenone (1.5 g, 7.4 mmol) was dissolved in 10 mL of ethanol In a 100 mL round bottom flask. Methylamine (4 mL, 8.1 mmol), as a 2M solution in THF, was added and the resulting reaction mixture was heated to reflux under nitrogen. The solution became bright yellow in color. The reaction mixture was heated at reflux for 30 minutes before cooling to room temperature. After evaporating about 2 mL of ethanol, the product crystallized. Recovery by filtration yielded the product (0.9 g, 4.1 mmol) as a bright yellow powder. NMR analysis showed the product to have a structure consistent with the following name: (E)-4,6-dichloro-2-(1-(methylimino)ethyl)phenol.

Example 3

5-Nitro-2-hydroxyacetophenone (1 g, 5.5 mmol) was dissolved in 10 mL of ethanol in a 100 mL round bottom flask. Methylamine (4 mL, 8.1 mmol), as a 2M solution in THF, was added and the resulting reaction mixture was heated to reflux under nitrogen. The solution became bright yellow in color. It was heated to reflux for 30 minutes before cooling to room temperature. The product crystallized upon cooling to room temperature. Recovery by filtration yielded the product (0.95 g, 5.0 mmol) as bright yellow fibrous crystals. NMR analysis showed the product to have a structure consistent with the following name: (E)-2-(1-(methylimino)ethyl)-4-nitrophenol.

Example 4

1,1'-(4,6-Dihydroxy-1,3-phenylene)bis-ethanone (1 g, 4.8 mmol), was dissolved in 10 mL of ethanol in a 100 mL round bottom flask. Methylamine (8 mL, 16 mmol), as a 2M solution in THF, was added and the reaction was heated to reflux under nitrogen. The solution became yellow in color. It was heated to reflux for 30 minutes before cooling to room temperature. The product crystallized following removal of a few mL of solvent under reduced pressure. The product (0.3 g, 1.4 mmol) was isolated by filtration as a yellow fine crystalline powder. NMR analysis showed the product to have a structure consistent with the following name: 2,4-bis((E)-1-(methylimino)ethyl)benzene-1,5-diol.

Example 5

2,2'-Dihydroxy-benzophenone (1 g, 4.6 mmol), was dissolved in 10 mL of ethanol in a 100 mL round bottom flask. Methylamine (3 mL, 6 mmol), as a 2M solution in THF, was added and the reaction was heated to reflux under nitrogen. The solution became yellow in color. It was heated to reflux for 60 minutes before cooling to room temperature. The product crystallized following removal of a few mL of solvent under reduced pressure. The product (0.7 g, 3.1 mmol) was isolated by filtration as a yellow fine crystalline powder. NMR analysis showed the product to have a structure consistent with the following name: (E)-2-(1-(methylimino)-o-hydroxyphenyl)phenol.

Example 6

6-Methoxy-2-hydroxyacetophenone (1 g, 6 mmol), was dissolved in 10 mL of ethanol in a 100 mL round bottom flask. Methylamine (4 mL, 8 mmol), as a 2M solution in THF, was added and the reaction was heated to reflux under nitrogen. The solution became yellow in color. It was heated to reflux for 60 minutes before cooling to room temperature. The solvent was evaporated to yield an oil which solidified upon the addition on a small amount of hexanes. The product (0.7 g, 3.9 mmol) was isolated by filtration as a light yellow solid. NMR analysis showed the product to have a structure consistent with the following name: (E)-3-methoxy-2-(1-(methylimino)ethyl)phenol.

Example 7

2-Hydroxyacetophenone (1 g, 7.4 mmol), was dissolved in 10 mL of ethanol in a 100 mL round bottom flask. Isopropylamine (0.75 mL, 8 mmol), was added and the reaction was heated to reflux under nitrogen. The solution became yellow in color. It was heated to reflux for 45 minutes before cooling to room temperature. The solvent was evaporated to yield the product (1.2 g, 6.7 mmol) as a yellow oil. NMR analysis showed the product to have a structure consistent with the following name: (E)-2-(1-(isopropylimino)ethyl)phenol.

Example 8

2-Hydroxyacetophenone (1 g, 7.4 mmol), was dissolved in 10 mL of ethanol in a 100 mL round bottom flask. Benzylamine (0.96 mL, 8.8 mmol) was added and the reaction was heated to reflux under nitrogen. The solution became yellow in color. It was heated to reflux for 30 minutes before cooling to room temperature. Upon cooling crystals formed and the product (1.6 g, 7.1 mmol) was collected by filtration as yellow fibrous crystals. NMR analysis showed the product to have a structure consistent with the following name: (E)-2-(1-(benzylimino)ethyl)phenol.

Example 9

5-Methoxy-2-hydroxyacetophenone (1 g, 6 mmol), was dissolved in 25 mL of ethanol in a 100 mL round bottom flask.

Methylamine (4 mL, 8 mmol), as a 2M solution in THF, was added and the resulting reaction mixture was heated to reflux under nitrogen. The solution became yellow in color. It was heated to reflux for 40 minutes before cooling to room temperature. Evaporation of the solvent yielded a yellow oil which crystallized upon the addition of a small amount of hexanes. The product (0.75 g, 4.2 mmol) was collected by filtration as a yellow solid. NMR analysis showed the product to have a structure consistent with the following name: (E)-4-methoxy-2-(1-(methylimino)ethyl)phenol.

Example 10

6-methoxy-2-hydroxyacetophenone (1 g, 6 mmol) was dissolved in 25 mL of ethanol in a 100 mL round bottom flask. Benzylamine (0.8 mL, 7.2 mmol), was added and the reaction was heated to reflux under nitrogen. The solution became yellow in color. It was heated to reflux for 120 minutes before cooling to room temperature. Evaporation of the solvent yielded a yellow oil which crystallized slowly upon standing to give the product (1.4 g, 5.5 mmol) as a yellow solid. NMR analysis showed the product to have a structure consistent with the following name: (E)-3-methoxy-2-(1-(benzylimino)ethyl)phenol.

Example 11

4-Methoxy-2-hydroxyacetophenone (1 g, 6 mmol), was dissolved in 25 mL of ethanol in a 100 mL round bottom flask. Methylamine (4 mL, 8 mmol), as a 2M solution in THF, was added and the reaction was heated to reflux under nitrogen. The solution became pale yellow in color. It was heated to reflux for 150 minutes before cooling to room temperature. Evaporation of the solvent gave the product (0.8 g, 4.6 mmol) as yellow crystals. NMR analysis showed the product to have a structure consistent with the following name: (E)-5-methoxy-2-(1-(methylimino)ethyl)phenol.

Example 12

2,6-Dihydroxyacetophenone (1 g, 6.5 mmol), was dissolved in 15 mL of ethanol in a 100 mL round bottom flask. Methylamine (5 mL, 10 mmol), as a 2M solution in THF, was added and the reaction was heated to reflux under nitrogen. The solution became pale yellow in color. It was heated to reflux for 60 minutes before cooling to room temperature. Upon cooling to room temperature the crystals formed and were collected via filtration and washed once with ethanol to give the product (0.6 g, 3.8 mmol) as yellow crystals. NMR analysis showed the product to have a structure consistent with the following name: (E)-3-hydroxy-2-(1-(methylimino)ethyl)phenol.

Example 13

6-Ethoxy-2-hydroxyacetophenone (1.0 g, 5.5 mmol), was dissolved with stirring in 15 ml of ethanol in a 100 mL round bottom flask. Methylamine (5 mL, 10 mmol), as a 2M solution in THF, was added and the reaction was heated to reflux for 2 hours. After refluxing for two hours the yellow solution was cooled to room temperature and the solvent evaporated yielding a yellow oil which crystallized upon standing to give the product (1.0 g, 5.2 mmol) as a yellow solid. NMR analysis showed the product to have a structure consistent with the following name: (E)-3-ethoxy-2-(1-(methylimino)ethyl)phenol.

Example 14

1-Hydroxy-2-acetonaphthone (1.0 g, 5.4 mmol), was dissolved with stirring in 15 ml of ethanol in a 100 mL round bottom flask. Methylamine (4 mL, 8 mmol), as a 2M solution in THF, was added and the reaction was heated to reflux for 30 minutes and cooled to room temperature. Evaporation of a few mL of solvent led to crystallization. The product (0.67 g, 3.3 mmol) was collected by filtration as a yellow crystalline solid. NMR analysis showed the product to have a structure consistent with the following name: (E)-2-(1-(methylimino)ethyl)-1-hydroxynaphthalene.

Example 15

2-Hydroxy-1-acetonaphthone (1.0 g, 5.4 mmol), was dissolved with stirring in 15 ml of ethanol in a 100 mL round bottom flask. Methylamine (4 mL, 8 mmol), as a 2M solution in THF, was added and the reaction was heated to reflux for 30 minutes and cooled to room temperature. Evaporation of a few mL of solvent led to crystallization. The product (0.67 g, 3.3 mmol) was collected by filtration as a yellow crystalline solid. NMR analysis showed the product to have a structure consistent with the following name: (E)-1-(1-(methylimino)ethyl)-2-hydroxynaphthalene.

Example 16

4-Methoxy-2-hydroxyacetophenone (1.3 g, 7.8 mmol), was dissolved with stirring in 20 ml of ethanol in a 100 mL round bottom flask. o-Fluorobenzylamine (1 g, 7.8 mmol), was added and the reaction was heated to reflux for 60 minutes and cooled to room temperature. Evaporation of the solvent led to a yellow oil that slowly crystallized upon standing to give the product (2.1 g, 7.7 mmol). NMR analysis showed the product to have a structure consistent with the following name: (E)-5-methoxy-2-(1-(o-fluorobenzylimino)ethyl)phenol.

Example 17

4-Fluoro-2-hydroxyacetophenone (1.0 g, 6.5 mmol), was dissolved with stirring in 20 mi of ethanol in a 100 mL round bottom flask. Methylamine (5 mL, 10 mmol), as a 2M solution in THF, was added and the reaction was heated to reflux for 45 minutes and cooled to room temperature. Evaporation of a few mL of solvent and cooling of the solution in an ice bath led to crystallization. The product (0.51 g, 3A mmol) was collected by filtration as a yellow crystalline solid. NMR analysis showed the product to have a structure consistent with the following name: (E)-5-fluoro-2-(1-(methylimino)ethyl)phenol.

Example 18

4-Methoxy-2-hydroxyacetophenone (1.3 g, 8.1 mmol), was dissolved with stirring in 20 ml of ethanol in a 100 mL round bottom flask. o-Hydroxybenzylamine (1 g, 8.1 mmol), was added and the reaction was heated to reflux for 15 minutes. After refluxing the solution was cooled to room temperature during which time crystallization occurred. The product (1.7 g, 6.3 mmol) was collected via filtration as a yellow crystalline powder. NMR analysis showed the product to have a structure consistent with the following name: (E)-5-methoxy-2-(1-(o-hydroxybenzylimino)ethyl)phenol.

Example 19

4,6-Dimethoxy-2-hydroxyacetophenone (1.0 g, 5.1 mmol) was dissolved with stirring in 20 ml of ethanol in a 100 mL round bottom flask. Methylamine (5 mL, 10 mmol), as a 2M solution in THF, was added and the reaction was heated to reflux for 120 minutes and cooled to room temperature. Evaporation of a few mL of solvent and cooling of the solution in an ice bath led to crystallization. The product (0.3 g, 1.4 mmol) was collected by filtration as a yellow crystalline solid. NMR analysis showed the product to have a structure consistent with the following name: (E)-3,5-methoxy-2-(1-(methylimino)ethyl)phenol.

Example 20

4-Methoxy-2-hydroxyacetophenone (1 g, 6 mmol), was dissolved with stirring in 20 ml of ethanol in a 100 mL round bottom flask. o-Aminobenzylamine (0.74 g, 6 mmol), was added and the reaction was heated to reflux for 45 minutes. After refluxing the solution was cooled to room temperature and a few mL of solvent were removed under reduced pressure, during which time crystallization occurred. The product (1.2 g, 6.3 mmol) was collected via filtration as a yellow crystalline powder. NMR analysis showed the product to have a structure consistent with the following name: (E)-5-methoxy-2-(1-(o-aminobenzylimino)ethyl)phenol.

Part B—Measurement of Changes in Optical Density in Solution

A few mg of the UV-absorbers from the above examples, were dissolved in chloroform, except Example 12 which required the addition of ethanol to dissolve the material. The changes in absorbance at the lambda max (λ max) indicated with respect to temperature were measured and reported in the table below. If the lambda max was below 350 nm, a higher wavelength was chosen for the measurement. These wavelengths were identified with an asterisk (*). Blank chloroform solutions were used as a reference. Absorbance measurements were carried out on a Cary 6000i UVNis spectrometer scanning from 600-270 nm at 600 nm/min with a step of 1 nm and an integration time of 0.1 seconds. 100% baseline correction was used to correct for slight variations between the sample and references beams. Using a 6×6 Peltier temperature controller, solutions were heated to 40° C. or cooled to 0° C. and equilibrated for at least 30 minutes before measuring their absorbance at the wavelength listed in the table below. The samples were continually stirred with built-in magnetic stirrers in the Peltier temperature controller. The sample chamber was continuously purged with nitrogen gas to prevent condensation on the cuvettes when the temperature was less than 15° C. The results for all of the above examples were reported below except Example 14 which decomposed under the test conditions.

| Example # | λ max (nm) | O.D. at 40° C. | O.D. at 0° C. |
|---|---|---|---|
| 1 | 390 | 0.88 | 1.24 |
| 2 | 418 | 2.24 | 2.88 |
| 3 | 394 | 1.54 | 1.64 |
| 4 | 386 | 1.21 | 1.50 |
| 5 | 349 | 0.59 | 0.65 |
| 6 | 390 | 0.45 | 0.63 |
| 7 | 400* | 0.22 | 0.30 |
| 8 | 389 | 0.31 | 0.39 |
| 9 | 420* | 0.23 | 0.28 |
| 10 | 390 | 0.33 | 0.44 |
| 11 | 380 | 0.85 | 1.11 |
| 12 | 394 | 0.20 | 0.32 |
| 13 | 390 | 0.08 | 0.11 |
| 15 | 414 | 1.09 | 1.30 |
| 16 | 385* | 0.29 | 0.39 |
| 17 | 385* | 0.20 | 0.26 |
| 18 | 385 | 0.21 | 0.27 |
| 19 | 322 | 0.60 | 0.65 |
| 20 | 350 | 0.43 | 0.67 |

Part C—Preparation of Polymer Films

Example 21

The UV absorber of Example 1 was dissolved in a solution of about 7 wt % poly(vinyl pyrrolidone) (MW=360,000) in chloroform. About 4 mL of this solution was spin-coated onto a square test substrate measuring 2"×2"×0.25" (5.08 cm×5.08 cm×0.635 cm), which was formed from a polymerizate of CR-39® monomer (available from HOMALITE), for 8-10 sec at 1500-2000 RPM and allowed to dry overnight at ambient temperature. Prior to spin coating, the chip was treated with a corona discharge from a Tantec unit operating at 54 kV for 45 seconds.

Example 22

The procedure of Example 21 was followed except that the UV absorber of Example 11 was dissolved in a solution of about 15 wt % poly(isobutyl methacrylate) (MW =130,000) in chloroform.

Example 23

The procedure of Example 21 was followed except that the UV absorber of Example 11 was dissolved in a solution of about 7 wt % of poly(vinyl pyrrolidone) (MW=360,000) in chloroform.

Example 24

A solution of about 7 wt % of poly(vinyl pyrrolidone) (MW=360,000) in chloroform was mixed in a 3:1 weight ratio with a solution of about 15 wt % of poly[4,4'-methylenebis(phenyl isocyanate)alt-1,4-butaned iol/di (propylene glycol)/polycaprolactone] (available from Aldrich) in N-methylpyrrolidone. This solution was then diluted by about 20 wt % with additional chloroform and used to dissolve about 10 mg of the UV absorber of Example 16. The spin-coating procedure of Example 21 was followed except that after coating the sample was heated in an oven at 75° C. for 45 minutes.

Example 25

A solution of about 7 wt % of poly(vinyl pyrrolidone) (MW=360,000) in chloroform was mixed in a 3:1 weight ratio with a solution of about 25 wt % of poly(ethylene glycol) (MW=1000) in chloroform. This polymer solution was then diluted with additional chloroform by about 20 wt %. This solution was then used to dissolve about 10 mg the UV absorber of Example 16. The spin-coating procedure of Example 21 was followed except that after coating the sample was heated in an oven at 75 ° C. for 45 minutes.

Example 26

A solution of about 7 wt % poly(vinyl pyrrolidone) (MW=360,000) in chloroform was mixed in a 3:1 weight ratio with a solution of about 15 wt % of poly[4,4'-methylenebis(phenyl isocyanate)alt-1,4-butanediol/di(propylene glycop/polycaprolactone] (available from Aldrich) in N-methylpyrrolidone. A few drops of triethylamine was then added and the resulting solution was diluted by about 20 wt % with additional chloroform. This solution was used to dissolve about 10 mg of the UV absorber of Example 16. The spin-coating procedure of Example 21 was followed except that after drying in air for 1 minute, 4 mL of a solution of about 15 wt % of polystyrene (MW =45,000) in toluene was spin coated for 8-10 sec at 1500-2000 RPM on top of the sample. The resulting chip was heated in an oven at 75° C. for 45 minutes.

Example 27

The procedure of Example 21 was followed except that the UV absorber of Example 16 (about 10 mg) was dissolved in about 10 grams of a solution of about 10 wt % of poly (sulfone) (MW=16,000) in chloroform.

Part D—Measurement of the Changes in Optical Density of Polymer Films

Polymer film coated substrate samples were prepared according to the above procedures. The amount of UV-absorber from examples 1, 11, and 16 incorporated into the polymer films was between approximately 0.1 and 2% such that a measurable optical density, typically between 0.1 and 3, was achieved. Absorbance measurements were carried out on a Cary 6000i UV/Vis spectrometer scanning from 600-270 nm at 600 nm/min with a step of 1 nm and an integration time of 0.1 seconds. 100% baseline correction was used. The temperature of the coated substrates was controlled using either an RTE-140 or RTE-220 recirculator that controlled the temperature in an air cell by means of a radiator and fan, which subsequently circulate conditioned air inside an insulated air cell inside of the Cary 6000i. The air cell inside the Cary was equipped with a self-centering substrate holding device, two evacuated windows to reduce condensation, and 2 holes for RTD probes from the Cary. The temperature of the coated substrates was allowed to equilibrate for at least 30 minutes prior to measuring the absorbance reported below.

| Example | λ max (nm) | OD at 0° C. | OD at 40° C. |
| --- | --- | --- | --- |
| 21 | 391 | 0.90 | 0.59 |
| 22 | 374 | 0.28 | 0.23 |
| 23 | 378 | 1.19 | 0.73 |
| 24 | 376 | 0.18 | 0.12 |
| 25 | 376 | 0.38 | 0.18 |
| 26 | 376 | 0.20 | 0.12 |
| 27 | 376 | 0.17 | 0.15 |

Part E—Preparation of Thermochromic Polymers

Example 28

Step 1

The procedure of Schrock and Osborn in "Inorganic Chemistry", 1970, 9, pages 2339-2343 was used to prepare bicyclo (2.2.1)hepta-2,5-diene-rhodium$^{(I)}$ tetraphenylborate as follows. Sodium tetraphenylborate 284 mg was dissolved In 20 mL of methanol in a round bottom flask with stirring. A solution of 200 mg of bicyclo(2.2.1)hepta-2,5-diene-rhodium$^{(I)}$ chloride dimer (available from Aldrich) dissolved in dichloromethane was added dropwise using a pipet. Crystals began to form and after stirring for 10 minutes the product was collected via filtration. Drying of the product using a vacuum pump yielded 370 mg of a light tan powder.

Step 2

In a two neck round bottom flask, 200 mL of THF was cooled in an ice bath to 0° C. Pyridine (5 mL, 66 mmol), hexanoyl chloride (5.2 mL, 37 mmol), and propargyl amine (4 mL, 91 mmol) were added sequentially. After the addition of the acid chloride a precipitate formed. After 5 minutes the reaction was warmed to room temperature and stirred for 1 hour. The precipitate was removed by filtration and the filtrate collected. The filtrate was diluted with ethyl acetate and washed twice with 1 M HCl, once with water, and once with sodium bicarbonate solution, dried over $MgSO_4$ and evaporated to give 4.5 g of off-white crystals. The product was subsequently used in the next step without characterization.

Step 3

The product of Step 2 (2 grams, 13.1 mmol) was dissolved in 13 mL of THF in a small round bottom flask with a stir bar. After bubbling with nitrogen for 10 minutes, bicyclo(2.2.1) hepta-2,5-diene-rhodium$^{(I)}$ tetraphenylborate from Step 1(60 mg, 0.13 mmol) was added and the reaction stirred for 75 minutes at room temperature. The reaction mixture changed in color from a light yellow to a dark orange over the course of the reaction. The reaction mixture was then poured into 300 mL of hexanes to precipitate the polymer. The product, poly (N-propargylhexanamide) was collected via filtration and dried using a vacuum pump to give 1.5 g of a light yellow flaky solid. The polymer was characterized by $^1H$ NMR and GPC and was found to be consistent with the structure of poly(N-propargylhexanamide).

Example 29

Step 1

The procedure of Step 1 of Example 28 was followed.

Step 2

(S)-(+)-2-Methylbutyric acid (7.7 g, 75 mmol) was dissolved in 100 mL of THF and N-methylmorpholine (8 mL, 82.5 mmol) in a round bottom flask. The solution was cooled in an ice bath and iso-butylchloroformate (10.7 mL, 82.5 mmol) was added. The solution turned cloudy. After 15 minutes of stirring, progargylamine (6.2 mL, 90 mmol), was added, resulting in an exothermic reaction. The ice bath was removed after a few minutes and the reaction was allowed to stir at room temperature for 1 hour. The reaction mixture was filtered to remove the precipitate and the filtrate was diluted with ethyl acetate. The resulting organic layer was washed with 1 M HCl and saturated sodium bicarbonate solution. It was dried over $MgSO_4$ and evaporated, The resulting residue was chromatographed on silica gel eluting with 1:1 hexanes/ ethyl acetate. Product containing fractions were evaporated to yield a white waxy solid (2.4 g, 17.3 mmol) which was subsequently used in the next step.

Step 3

In a round bottom flask containing 15 mL of THF, the product of Step 2 (2.4 g, 17,2 mmol) was dissolved and bubbled with nitrogen for 15 minutes. Bicyclo(2.2.1)hepta-2,5-diene-rhodium$^{(I)}$ tetraphenylborate from Step 1 (76 mg, 0.17 mmol) was added and the reaction was stirred at room temperature for 75 minutes. The solution changed in color from light yellow to orange to dark brown and thickened. After 75 minutes the reaction was poured into 300 mL of hexanes to precipitate the polymer. The product was collected by filtration and dried under reduced pressure to yield a light yellow solid, The polymer was characterized by GPC and $^1$H NMR and showed the product to be consistent with the structure of poly[(S)-N-propargyl-2-methylbutanamide].

Part F—Measurement of Changes in Optical Density of the Thermochromic Polymers

A few mg of the polymers from Examples 28 and 29 were dissolved in cuvettes containing chloroform and THF, respectively. The concentration of the polymers was adjusted such that their optical density between 275 and 500 nm was <4.0. Cuvettes containing chloroform and THF without polymer dissolved in them were also prepared for use as reference cells. The absorbance was measured at 390 nm on a Cary Model 6000i UV/Vis spectrometer equipped with a Peltier 6×6 temperature controller. The absorbance was scanned from 275-500 nm at a rate of 600 nm/min in 1 nm steps with an integration time of 0.1 seconds. The table below demonstrates the change in absorbance of the polymers between 5 and 35° C.

| Example | O.D. @ 5° C. | O.D. @ 35° C |
|---|---|---|
| 28 | 3.53 | 0.14 |
| 29 | 0.68 | 0.22 |

Part G—Measurement of Changes in Optical Density of an Assembly of a Photochromic Substrate and Thermochromic Polymer Solution A photochromic polyurethane coating (of the type described in U.S. Pat. No. 6,187,444 B1) was applied to a test substrate measuring 2"×2"×0.25" (5.08 cm×5.08 cm×0.635 cm), which was formed from a polymerizate of CR-39® monomer (available from HOMALITE), and thermally cured. The photochromic polyurethane coating was approximately 20 microns thick. Prior to spin coating, the test substrate was treated with a corona discharge from a Tantec unit operating at 54 kV for 45 seconds. A solution of the polymer of Example 28 in a 1 mm pathlength cuvette (25 mm round) was positioned in front of the photochromic coated substrate to form an assembly that was tested on an optical bench. For comparison, a chloroform solution containing no polymer, a Control, was also positioned in front of photochromic coated substrate prepared in the same manner and tested on the optical bench using the following procedure.

An optical bench was used to measure the optical properties of the sample. The sample was placed on the optical bench with an activating light source (an Newport/Oriel Model 67005 300-Watt Xenon arc lamp with light intensity controller) fitted with a Uniblitz VS25 high-speed computer controlled shutter that momentarily closed during data collection so that stray light would not interfere with the data collection process, a Schott 3 mm KG-2 band-pass filter, which removed short wavelength radiation, neutral density filter(s) for intensity attenuation and a condensing lens for beam collimation) positioned at a 30° to 35° angle of incidence a surface of the sample.

A broadband light source for monitoring response measurements was positioned in a perpendicular manner to a surface of the sample. Increased signal of shorter visible wavelengths was obtained by collecting and combining separately filtered light from a 100-Watt tungsten halogen lamp (controlled by a Lambda ZUP60-14 constant voltage powder supply) with a split-end, bifurcated fiber optical cable. Light from one side of the tungsten halogen lamp was filtered with a Schott KG1 filter to absorb heat and a Hoya B-440 filter to allow passage of the shorter wavelengths. The other side of the light was unfiltered. The light was collected by focusing light from each side of the lamp onto a separate end of the split-end, bifurcated fiber optic cable, and subsequently combined into one light source emerging from the single end of the cable. A 4" light pipe was attached to the single end of the cable to insure proper mixing.

The samples were run in a temperature controlled air cell, at 23, 35 and 5 C. (±0.2° C. or better) maintained by circulating conditioned water (Neslab RTE-17) through a radiator/fan combination in the air cell. 1 mm pathlength, fused silica "lollipop" cuvettes (Starna) containing the solution of Example 28 or the Control with no polymer were taped to the front of the samples.

To conduct the measurements, the sample was exposed to 6.7 W/m$^2$ of UVA from the activating light source for 5 to 15 minutes to activate the photochromic in the polyurethane coating. An International Light Research Radiometer (Model IL-1700) with a detector system (Model SED033 detector, B Filter, and diffuser) was used to verify exposure prior to each test. Light from the monitoring source was then passed through the coated sample and focused on a 1" integrating sphere, which was connected to an Ocean Optics 2000 spectrophotometer using a single function fiber optic cable. The spectral information, after passing through the sample, was collected using Ocean Optics OOIBase32 and OOIColor software, and PPG propriety software.

Absorption spectra were obtained and analyzed for each sample using the Igor Pro software (available from WaveMetrics). The change in the absorbance was calculated by subtracting out the 0 time (i.e., unactivated) absorption measurement for the sample at each wavelength tested. Average absorbance values were obtained in the region of the activation profile where the photochromic response of the photochromic coating was saturated or nearly saturated (i.e., the regions where the measured absorbance did not increase or did not increase significantly over time) for each sample by averaging absorbance at each time interval in this region. For each wavelength extracted, 5 to 100 data points were averaged. Optical density results were presented in the following table with calculated Percent loss in OD from 5 to 23° C. and 5 to 35° C.

| Sample | Photopic OD @ 5° C. | Photopic OD @ 23° C. | Photopic OD @ 35° C. | % OD Loss 5-23° C. | % OD Loss 5-35° C. |
|---|---|---|---|---|---|
| Control | 1.77 | 1.02 | 0.60 | 42% | 66% |
| Example 28 | 0.89 | 0.88 | 0.47 | 1% | 47% |

Whereas particular embodiments of this invention have been described above for purposes of illustration, it will be evident to those skilled in the art that numerous variations of the details of the present invention may be made without departing from the invention as defined in the appended claims.

We claim:

1. A photochromic optical article comprising:
   (a) an optical substrate;
   (b) a thermally reversible photochromic material; and (c) a reversible thermochromic material operable for at least partially filtering UV/visible light at or below room temperature and becoming less operable for filtering UV/visible light at temperatures greater than room temperature, wherein the reversible thermochromic material (c) comprises a tautomer selected from a Schiff base and/or a Mannich base.

2. The photochromic optical article of claim 1, wherein the reversible thermochromic material (c) is operable for filtering light in the wavelength range of from 300 to 450 nanometers.

3. The photochromic optical article of claim 2, wherein the reversible thermochromic material (c) is operable for filtering light at temperatures ranging from −100° C. to 25° C.

4. The photochromic optical article of claim 1, wherein the tautomer comprises a Schiff base of 2-hydroxyacetophenone and/or aliphatic or benzylic amine.

5. The photochromic optical article of claim 1, wherein the tautomer is a Mannich base which comprises (3-piperidinylmethyl)-2,4-dihydroxybenzophenone, (3-morpholinyhethyl)-2-4dihydroxybenzophenone, (3-pyrrolidinylmethyl)-2-4-dihydroxybenzophenone, (3-benzylmethylaminomethyl)-2,4-dihydroxybenzophenone, (3,5-dipiperidinylmethyl)-2,4-dihydroxybenzophenone, (3-bis-(2-hydroxyethyl)aminomethyl)-2,4-dihydroxybenzophenone, methyl-3-(pyrrolidinylmethyl)-4-hydroxy cinnamate, 7-hydroxy-(8-piperidinylmethyl)-4-trifluoromethylcoumarin, and/or 6-hydroxyl-5-(piperidinylmethyl) flavones.

6. The photochromic optical article of claim 1, wherein the thermally reversible photochromic material (b) comprises pyrans, fulgides, and/or oxazines.

7. The photochromic optical article of claim 6, wherein the photochromic material (b) comprises naphthopyrans and/or indenonaphthopyrans.

8. The photochromic optical article of claim 1, wherein the optical article is an ophthalmic lens.

9. A photochromic optical article comprising:
(a) an optical substrate;
(b) a thermally reversible photochromic material; and
(c) a reversible thermochromic material operable for at least partially filtering UV/visible light at or below room temperature and becoming less operable for filtering UV/visible light at temperatures greater than room temperature, wherein the reversible thermochromic material (c) comprises a thermochromic polymer which undergoes conformational induced chromism in response to temperature, said thermochromic polymer comprising a helical polymer.

10. The photochromic optical article of claim 9, wherein the thermochromic helical polymer is selected from polythiophenes, polysilanes, poly(propargyl amides) and/or polydiacetylenes.

11. The photochromic optical article of claim 9, wherein the thermally reversible photochromic material (b) comprises pyrans, fulgides and/or oxazines.

12. The photochromic optical article of claim 11, wherein the thermally reversible photochromic material (b) comprises naphthopyrans and/or indenonaphthopyrans.

13. The photochromic optical article of claim 9, wherein the optical article is an ophthalmic lens.

14. The photochromic optical article of claim 9, wherein the reversible thermochromic material (c) is operable for filtering light in the wavelength range of from 300 to 450 nanometers.

15. The photochromic optical article of claim 14, wherein the reversible thermochromic material (c) is operable for filtering light at temperatures ranging from −100° C. to 25° C.

16. The photochromic optical article of claim 9, wherein the optical article is an ophthalmic lens.

* * * * *